(12) United States Patent
Kanbara et al.

(10) Patent No.: US 6,516,201 B2
(45) Date of Patent: Feb. 4, 2003

(54) MOBILE RADIO COMMUNICATION APPARATUS HAVING A PLURALITY OF MINS

(75) Inventors: Masatomo Kanbara, Tokyo (JP);
Akira Ishikura, Kanagawa-ken (JP);
Osamu Kurokawa, Tokyo (JP);
Yoshihiro Nomura, Tokyo (JP);
Masakuni Hyodo, Tokyo (JP); Ken
Nakamura, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/268,694

(22) Filed: Mar. 16, 1999

(65) Prior Publication Data

US 2001/0053702 A1 Dec. 20, 2001

(30) Foreign Application Priority Data

Mar. 17, 1998 (JP) .......................... 10-067152

(51) Int. Cl.⁷ .............................. H04B 1/38; H04M 1/00
(52) U.S. Cl. ........................ 455/551; 455/557; 455/552
(58) Field of Search ................................ 455/418, 419, 455/466, 551, 552, 553, 557, 426

(56) References Cited

U.S. PATENT DOCUMENTS 5,551,073 A * 8/1996 Sammarco .................. 455/411
5,918,172 A * 6/1999 Saunders et al. ............ 455/557
5,946,633 A * 8/1999 McAlinden .................. 455/551

* cited by examiner

Primary Examiner—Nguyen T. Vo
Assistant Examiner—James Moore
(74) Attorney, Agent, or Firm—Finnegan, Henderson, Farabow, Garrett & Dunner, L.L.P.

(57) ABSTRACT

There is provided a mobile radio communication apparatus being able to transmit data and voice, connected with one of base stations over a radio communication channel, the apparatus comprising a plurality of mobile identification numbers (MINs), an interface being able to connected with an external device inputting data from the external device and outputting data to the external device, data communication request detecting means for detecting a data communication request from the external device through the interface, and connection control means for controlling the connection with the base station by using a first MIN of the plurality of MINs responsive to output of the detecting means.

In the mobile radio communication apparatus having the above constitutions, the data communication request detecting means detects a data communication request from the external device. If the detecting means detects such request, the connection control means controls the connection with the base station by using the MIN for the data communication. Consequently, the apparatus selects the suitable MIN automatically without selecting the MIN manually by the user. It can avoid the manual selection of the MIN which increases the possibility of incorrect selection.

6 Claims, 4 Drawing Sheets

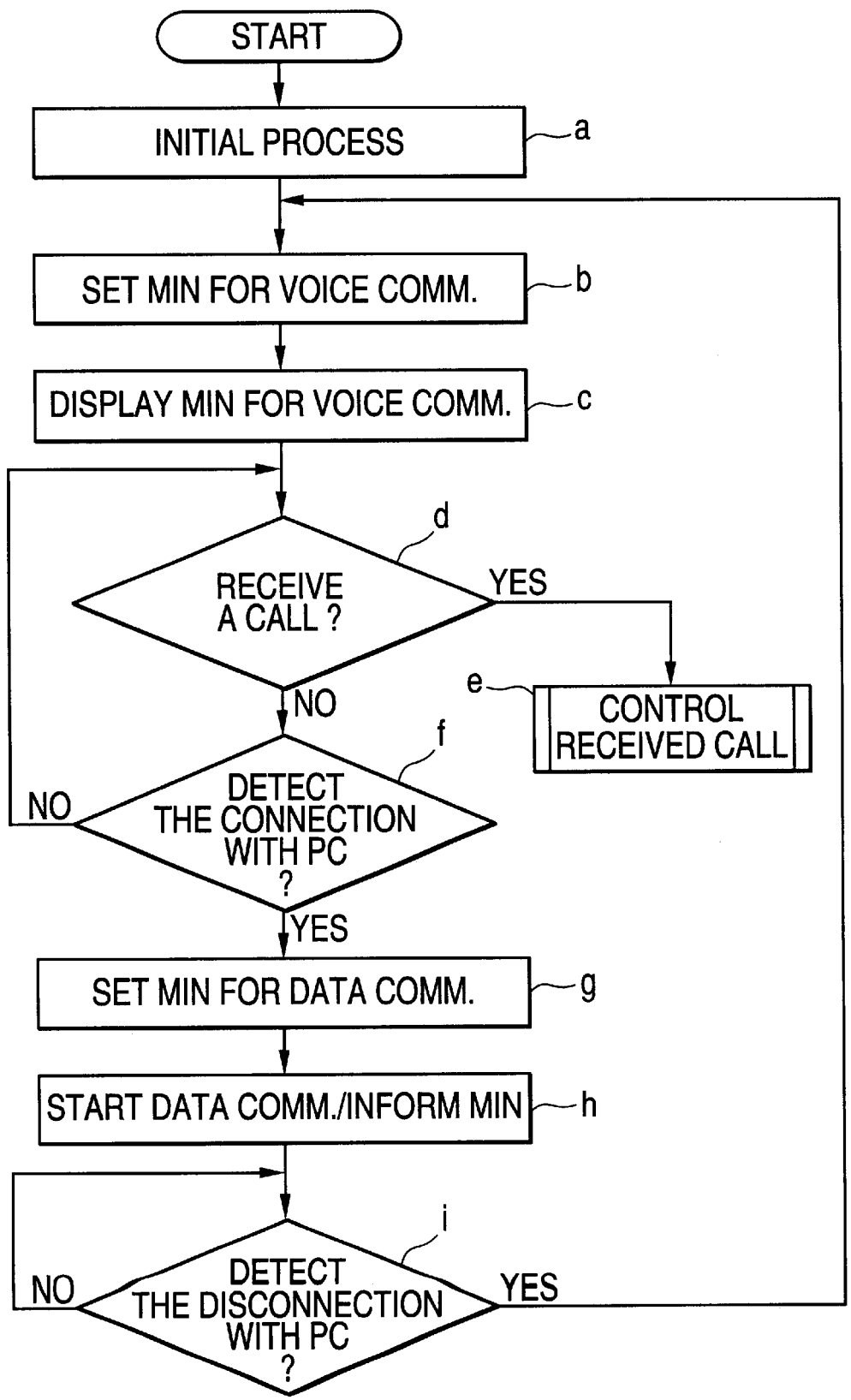

MOBILE RADIO COMMUNICATION APPARATUS HAVING A PLURALITY OF MINS

BACKGROUND OF THE INVENTION

1. Field of the Invention

This invention is related to the mobile radio communication apparatus such as cellular telephones, PCS (Personal Communication System), PHS (Personal Handy phone System). Recently, the data communication so called "mobile computing" with the mobile radio communication apparatus and the personal computer is quite popular.

2. Description of the Related Art

Normally, when the user originate a call with the radio communication apparatus, a mobile identification number (hereinafter referred to MIN) is used. As the mobile computing is developed, the development of mobile radio communication apparatus having two MINs for the voice communication and the data communication is forwarded. But, the present apparatus now being developed has some problems. In this apparatus, the users have to select a MIN corresponding to the type of the communication manually. For example, if the user wants to send the e-mail with his or her personal computer, the user have to select a MIN for the data communication from two MINs stored in the apparatus manually. If the user wants to make a call after the completion of the sending the e-mail, he or she selects a suitable MIN for the voice communication manually. This manual operation is not only quite troublesome but also increases the number of mistake. It may happen that the MIN which the user does not want to use might be used if the user selects the MIN incorrectly.

BRIEF SUMMARY OF THE INVENTION

The object of the present invention is to provide a mobile radio communication apparatus capable of selecting the suitable MIN from the stored plural MINs automatically in accordance with the type of the communication which the user desires.

In order to attain the above object, there is provided a mobile radio communication apparatus being able to transmit data and voice, connected with one of base stations over a radio communication channel, the apparatus comprising a plurality of mobile identification numbers (MINs), an interface being able to connected with an external device inputting data from the external device and outputting data to the external device, data communication request detecting means for detecting a data communication request from the external device through the interface, and connection control means for controlling the connection with the base station by using a first MIN of the plurality of MINs responsive to output of the detecting means.

In the mobile radio communication apparatus having the above constitutions, the data communication request detecting means detects a data communication request from the external device. If the detecting means detects such request, the connection control means controls the connection with the base station by using the MIN for the data communication. Consequently, the apparatus selects the suitable MIN automatically without selecting the MIN manually by the user. It can avoid the manual selection of the MIN which increases the possibility of incorrect selection.

The above described apparatus wherein the connection control means controls the connection with the base station by using a second mobile identification number (MIN) which is different from the first MIN as long as the detecting moans does not detect data communication request after the data communication is terminated. In the mobile radio communication apparatus having the above constitutions, the user can use the suitable MIN without selecting the MIN manually when the user wants to make the voice communication after the data communication is over.

The above described apparatus further comprising informing means for informing which MIN is used when the control means controls the connection with the base station. In the mobile radio communication apparatus having the above constitutions, the user can see which MIN is used during the communication with the base station over the radio communication channel.

In order to attain the above object, there is provided a mobile radio communication apparatus being able to transmit data and voice, connected with one of base stations over a radio communication channel, the apparatus comprising a plurality of mobile identification numbers (MINs), an interface being able to connected with an external device inputting data from the external device and outputting data to the external device, connection detecting means for detecting whether the external device is connected with the interface or not, and connection control means for controlling the connection with the base station by using a first MIN of the plurality of MINs responsive to output of the connection detecting means.

In the mobile radio communication apparatus having the above constitutions, the communication detecting means detects whether the external device is connected with the interface or not. If the detecting means detects such connection, it assumes that the user wants to make the data connection with the external device. So, the connection control means controls the connection with the base station by using the MIN for the data communication. Consequently, the apparatus selects the suitable MIN automatically without selecting the MIN manually by the user. It can avoid the manual selection of the MIN which increases the possibility of incorrect selection.

The above described apparatus wherein the connection control means controls the connection with the base station by using second mobile identification number (MIN) which is different from the first MIN when the external device is disconnected with the interface. The disconnection of the external device from the interface assumes that the data communication is over. In the mobile radio communication apparatus having the above constitutions, the user can use the suitable MIN without selecting the MIN manually when the user wants to make the voice communication after the data communication is over.

The above described apparatus further comprising informing means for informing which MIN is used when the control means controls the connection with the base station. In the mobile radio communication apparatus having the above constitutions, the user can see which MIN is used during the communication with the base station over the radio communication channel.

BRIEF DESCRIPTION OF THE DRAWINGS

The accompanying drawings, which are incorporated in and constitute a part of the specification, illustrate presently preferred embodiments of the invention, and together with the general description given above and the details description of the preferred embodiments given below, serve to explain the principles of the invention.

FIG. 4 is a flow chart which describes the operation of the apparatus shown in FIG. 3.

DETAILED DESCRIPTION OF THE PREFERRED EMBODIMENTS

An embodiment of the present invention will now be described with reference to the accompanying drawings.

Figure 1:
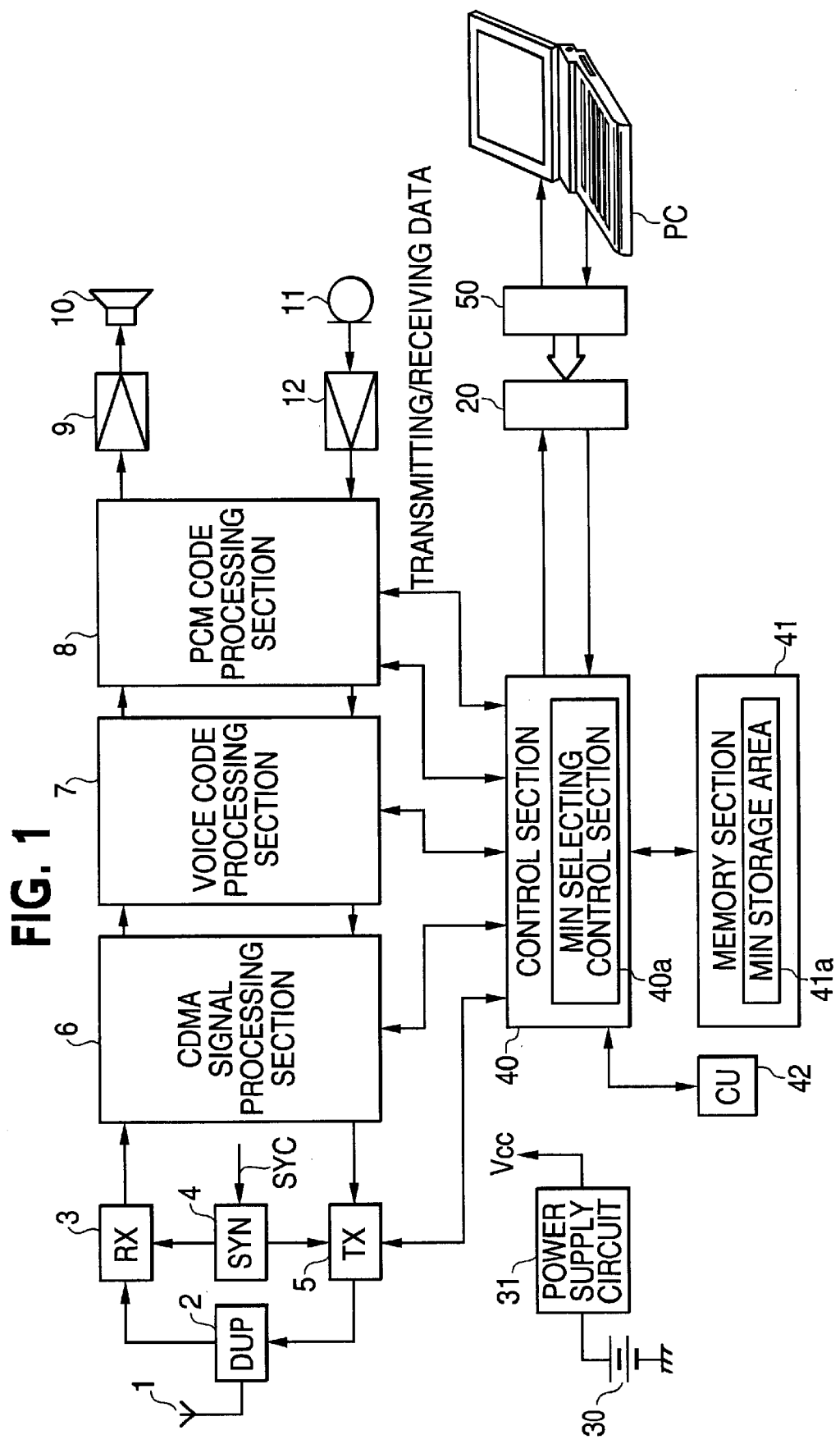
FIG. 1 is a circuit diagram of the constitution of a mobile radio communication apparatus having a plurality of MINs according to an embodiment of the present invention.

FIG. 1 illustrates the constitution of the radio communication apparatus having a plurality of MINs according to the present invention. The apparatus is designed for the CDMA (Code Division Multiple Access) system in this embodiment.

A radio frequency signal (hereinafter referred to as RF signal), which was tent from the base station (not shown) through a digital communication channel, is received by an antenna 1 and, then inputted to a reception circuit (RX) 3 via a duplexer (DUP) 2.

In the reception circuit 3, RF signal is mixed with a received local oscillation signal outputted from a frequency synthesizer (SYN) 4, and the mixed signal is frequency-converted to an intermediate frequency signal (hereinafter referred to as IF signal). The frequency of the received local oscillation signal generated from the frequency synthesizer 4 is indicated by a control signal SYC outputted from a control section 40.

IF signal is orthogonal-demodulated in a CDMA signal processing section 6. In this section 6, the orthogonal-demodulated signal is subjected to reverse spread processing using PN code and converted to the predetermined data format in accordance with a data rate.

The result of this conversion is inputted to a voice code processing section 7 as a reception data. The data of the above described reception data, which shows the data rate is inputted to the control section 40 as the reception data rate.

The voice code processing section 7 expands the reception data in accordance with the reception data rate outputted from the control section 40. The output of the voice code processing section 7 is inputted to a PCM code processing section 8.

The process in the PCM code processing section 8 differs in accordance with the type of the communication (that is, voice communication or data communication) which is informed from the control section 40.

In the voice communication, the PCM code processing section 8 demodulates the expanded reception data to get an analog reception signal. This analog reception signal is amplified at an amplifier 9 and outputted from a loudspeaker 11. In the data communication, the expanded reception data is outputted to an interface 20 (hereinafter referred to as I/F) through the control section 40.

A voice supplied to a microphone 11 as an analog transmission signal is amplified by an amplifier 12 to a predetermined level and then supplied to the voice code processing section 7 via the PCM code processing section 8. A transmission data is inputted at I/F 20 and outputted to the control section 40 and the PCM code processing section 8 via the voice code processing section 7.

In the voice communication, the voice code processing section 7 measures the energy of the inputted voice by detecting the transmission data from the PCM code processing section 8 and determines the data rate based upon the measured energy. The voice code processing section 7 compresses the transmission data into a burst signal with a predetermined format corresponding to the data rate and inputs such data into the CDMA signal processing section 6.

In the data communication, the voice code processing section 7 compresses the transmission data inputted from the PCM code processing section 8 into a burst signal with a predetermined format corresponding to a predetermined data rate and inputs such data into the CDMA signal processing section 6. Each data rate in either the voice communication or the data communication is provided at the control section 40 as a transmission data rate.

In the CDMA signal processing section 6, the compressed burst signal is subjected to spread processing using a PN code corresponding to a transmission channel and then orthogonal-modulated. The orthogonal-modulated signal is inputted to a transmission circuit (TX) 5.

In the circuit 5, the orthogonal-modulated signal is synthesized with a transmission local oscillation signal into a radio frequency signal. This signal is high-frequency-amplified. The above transmission local oscillation signal is generated by the frequency synthesizer 4 and its frequency corresponds to the control signal SYC outputted from the control section 40.

The transmission radio frequency signal outputted from the circuit 5 is supplied to the antenna 1 through the duplexer 2 and then transmitted to the base station (not shown) therefrom.

The I/F 20 is the interface which inputs data outputted from a personal computer (hereinafter referred to as PC) such as a PDA (Personal Digital Assistance) or a note book type personal computer and outputs data to the PC.

In FIG. 1, reference numeral 31 denotes a power supply circuit. In this circuit, a predetermined operation power supply voltage Vcc is generated based on the output of the battery 30 and supplied to the respective circuits.

The control section 40 includes a microcomputer as a main control section, controls the respective parts of the apparatus itself and exercises the control of recording/reproducing a voice of the other party by using a memory section 41 as well as normal control of communications of voice and data communications between the base station (not shown) and the apparatus over the communication link.

The control section 40 has a MIN selecting control section 40a. This section 40a selects one of two MINs which have been already assigned to the apparatus by using the microcomputer. One MIN is used for the voice communication. The other MIN is used for the data communication. The program which performs the operation of the MIN selection control section 40a is stored in the portion of the control section 40. This program may be stored in the memory section 41.

Memory section 41 uses a semiconductor memory such as a ROM and a RAM as a storage medium. The storage medium includes an area for storing two MINs (one is used for normal voice communication and the other is used for the data communication) assigned by the carrier. This area Is shown as a MIN storage area 41a in FIG. 1. The storage medium also includes an area for storing control programs of the control section 40, control data of transmitted/received signals, dial data corresponding to abbreviated dialing and so on.

A console unit (CU) 42 is provided with a key group including a dial key, a send key, a power key, an end key, a volume key and a mode designating key, an LCD display for displaying a telephone number of the other party, an operation state of the apparatus, an discharging status of a battery 30 and so on.

Figure 2:
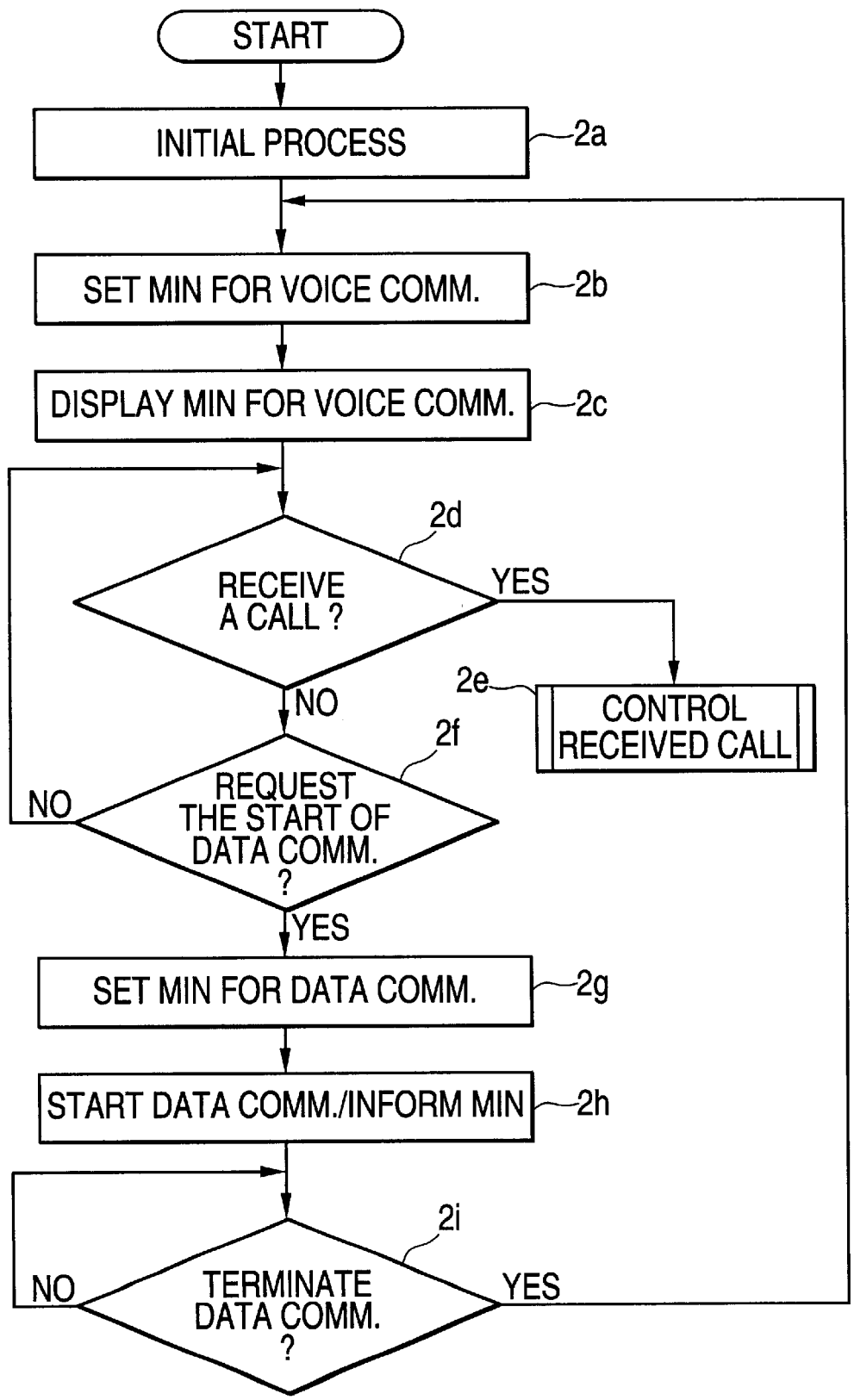
FIG. 2 is a flowchart which describes the operation of the apparatus shown in FIG. 1.

The operation of the apparatus will now be described with reference to the accompanying flowchart shown in FIG. 2.

First, if a user of the apparatus operates the power key in the CU 42 and the power is "on", then the control section 40 performs the predetermined initial process (STEP 2a). Next, the control section 40 reads MIN for the voice communication from the MIN storage area 41a, sends it to the base station which belongs to a system where the apparatus is used and asks the base station to do the authentication process to make sure whether the apparatus is authorized by the system (STEP 2b).

If the notice which indicates the authentication was completed is transmitted to the apparatus, the control section 40 controls the LCD (not shown) in the CU 42 in order to make it display MIN for the voice communication which indicates the communication is available (STEP 2c), and then supervises if there is a receiving call or not (STEP 2d). The control section 40 also supervises if there is a request for the start of the data communication from the PC via the I/F 20 (STEP 2f).

If the apparatus receives a call from the base station, the control section 40 performs normal process for the reception control (STEP 2e). If the control section 40 detects the request for the start of data communication from the PC, the MIN selecting control section 40a reads MIN for the data communication from the MIN storage area 41a instead of MIN for the voice communication. The request may be responsive to the command from the user this command may be entered from the PC by the user. If the user wants to send the e-mail by using this apparatus, the command may be inputted by touching the "enter" key of the PC after the user completed the text data and the address of the e-mail.

The selected MIN is sent to the base station for the authentication process (STEP 2g).

In STEP 2h, the control section 40 controls a call origination and starts data communication in accordance with a predetermined communication protocol. In this step, the LCD in the CU 42 displays the MIN which is presently used. It enables the user of the apparatus to make sure the correct MIN is used.

In STEP 2I, the MIN selecting control section 40a supervises the termination of data communication (the request for the channel disconnection from PC). If the data communication is terminated, then the authentication process is performed by using the MIN for voice communication (STEP 2b).

The apparatus with the above described components can select a suitable MIN corresponding to the type of the communication automatically. If there is the request for the start of the data communication, the MIN selecting control section 40a selects the MIN for data communication instead of selecting the MIN for voice communication. If the data communication is terminated, the MIN selecting control section 40a selects the MIN for the Voice communication instead of selecting the MIN for data communication automatically.

Therefore, according to the above described apparatus, the user does not have to select one MIN which is suitable for the character of the communication manually.

It is expected that the carriers who provide mobile radio communication service will plan new rate structure which differs from the already existed one. In the near future, the carrier will set a varaiety of the rates which differ in accordance with the type of used MIN. For example, the rate with MIN for the data communication will be much lower than the rate with MIN for the voice communication. Since the above described apparatus automatically selects MIN for the data communication when the request for the data communication is detected by the control section instead of selecting one MIN by the user manually. It can be avoided that the higher rate is charged at the data communication in the above descrived rate structure. Furthermore, according to this apparatus, since the MIN is selected in accordance with the type of the communication (that is, the voice communication or the data communication), the user can organize the charge for the voice communication and the data communication separately.

There is some merit not only for the customer (the user of the apparatus) but also for the carriers who provide mobile radio communication service. According to this apparatus, the carriers only supervise which MIN is used by the apparatus because the MIN determines what type of the communication is conducted by the apparatus. So, it can be easy for the carrier to charge the rate to the customer.

Figure 3:
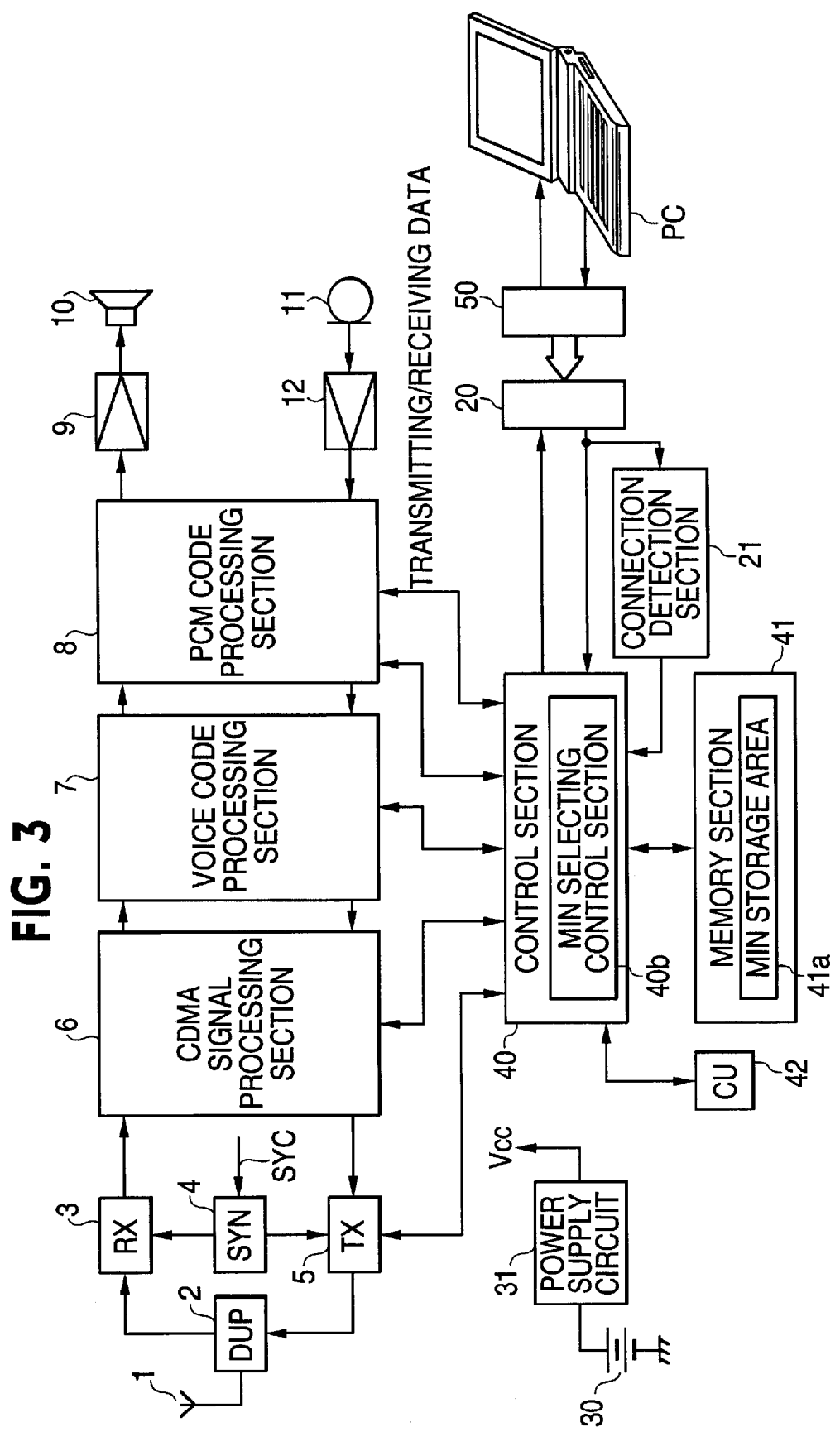
FIG. 3 is a circuit diagram of the constitution of a mobile radio communication apparatus having a plurality of MINs according to an embodiment of the present invention.

The present invention is not limited to the above embodiment. FIG. 3 is another embodiment of the present invention and will now be described. The description of both operation and components which are the same as the apparatus shown in FIG. 1 will be omitted. Only the different portion will be described.

The apparatus shown in FIG. 3 includes a connection detecting portion 21 which detects the connection between I/F 20 and an interface (I/F) 50 of the PC. The apparatus shown in FIG. 3 also includes a MIN selecting control section 40b which changes the MIN in response to the result of the detection at the connection detecting portion 21.

FIG. 4 illustrates the flowchart for describing the operation of the apparatus shown in FIG. 3.

First, if a user of the apparatus operates the power key in the CU 42 and the power is "on", then the control section 40 performs the predetermined initial process (STEP 4a). Next, the control section 40 reads MIN for the voice communication from the MIN storage area 41a, sends it to the base station which belongs to a system where the apparatus is used and asks the base station to do the authentication process to make sure whether the apparatus is authorized by the system (STEP 4b).

If the notice which indicates the authentication was completed is transmitted to the apparatus, then the control section 40 controls a LCD (not shown) in the CU 42 in order to make it display MIN for the voice communication which indicates the communication is available (STEP 4c), and supervises if there is a receiving call or not (STEP 4d). The MIN selecting control section 40b supervises the output of the connection detection section 21 (STEP 4f).

If the apparatus receives a call from the base station, the control section 40 performs normal process for the reception control (STEP 4e). If the connection detection section 21 detects that I/F 20 is connected with the PC, the MIN selecting control section 40b reads MIN for the data communication from the MIN storage area 41a instead of MIN for the voice communication. The selected MIN is sent to the base station for the authentication process (STEP 4g). The program which performs the operation of the MIN selecting control section 40b is stored in the portion of the control section 40. This program may be stored in the memory section 41.

In STEP 4h, the control section 40 controls a call origination and starts the data communication in accordance with a predetermined communication protocol. In this step, the LCD in the CU 42 displays the MIN which is presently used. It enables the user of the apparatus to make sure the correct MIN is used.

In STEP 2I, the MIN selecting control section 40b watches the output of the connection detection section 21. If the connection detection section 21 does not detect that I/F 20 is connected with the PC, then the authentication process is performed by using MIN for the voice communication (STEP 2b).

The apparatus with above described components can select a suitable MIN corresponding to the type of the communication automatically. If the connection detection section 21 detects that I/F 20 is connected with PC, the MIN selecting control section 40b selects the MIN for the data communication instead of the MIN for the voice communication. If the PC is disconnected and the connection detection section 21 does not detect that I/F 20 is connected with PC, the MIN selecting control section 40b changes the MIN for the data communication into the MIN for the voice communication. Therefore, according to the above described apparatus, the user does not have to select one MIN manually.

The present invention is not limited to the above embodiments. It is needless to say that various changes and modifications can be made without departing from the scope of the subject matter of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio communication apparatus being able to transmit data and voice, connectable with one of a plurality of base stations over a radio communication channel, the apparatus comprising:

a single memory for storing a first mobile identification number (MIN) for data transmission and a second MIN for voice transmission, a set of the first and second MINs being pre-assigned to the apparatus;

an interface capable of being connected with an external device inputting data from the external device and outputting data to the external device;

connection detecting means for detecting whether the external device is connected with the interface or not; and connection control means for controlling the connection with the base station by using the first MIN responsive to output of the connection detecting means.

2. The apparatus according to claim 1, wherein the connection control means controls the connection with the base station by using the second mobile identification number (MIN) which is different from the first MIN when the external device is disconnected with the interface.

3. The apparatus according to claim 1 further comprising informing means for informing which MIN is used when the control means controls the connection with the base station.

4. A mobile radio communication apparatus being able to transmit data and voice, connectable with one of a plurality of base stations over a radio communication channel, the apparatus comprising:

a single memory for storing a first mobile identification number (MIN) for data transmission and a second MIN for voice transmission, the first and second MINs being pre-assigned to the apparatus;

an interface capable of being connected with an external device inputting data from the external device and outputting data to the external device;

a connection detecting unit configured to detect whether the external device is connected with the interface or not; and a connection control unit configured to control the connection with the base station by using the first MIN responsive to output of the connection detecting unit.

5. The apparatus according to claim 4, wherein the connection control unit controls the connection with the base station by using a second MIN which is different from the first MIN when the connection detecting unit detects that the external device is disconnected with the interface.

6. The apparatus according to claim 4, further comprising an informing unit for informing an user which MIN is used when the connection control unit controls the connection with the base station.

* * * * *